(12) United States Patent
Fujimura et al.

(10) Patent No.: US 9,704,651 B2
(45) Date of Patent: Jul. 11, 2017

(54) ELECTRONIC COMPONENT

(71) Applicant: TDK CORPORATION, Tokyo (JP)

(72) Inventors: Tomoyoshi Fujimura, Tokyo (JP);
Atsushi Sato, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 14/597,528

(22) Filed: Jan. 15, 2015

(65) Prior Publication Data

US 2015/0206661 A1    Jul. 23, 2015

(30) Foreign Application Priority Data

Jan. 17, 2014  (JP) .................................. 2014-007079

(51) Int. Cl.
| | |
|---|---|
| H01G 4/228 | (2006.01) |
| H01G 4/35 | (2006.01) |
| H01G 4/30 | (2006.01) |
| H01G 2/06 | (2006.01) |
| H01G 4/012 | (2006.01) |
| H01G 4/232 | (2006.01) |
| H01G 4/12 | (2006.01) |

(52) U.S. Cl.
CPC ................. *H01G 4/30* (2013.01); *H01G 2/06* (2013.01); *H01G 4/012* (2013.01); *H01G 4/228* (2013.01); *H01G 4/232* (2013.01); *H01G 4/35* (2013.01); *H01G 4/12* (2013.01)

(58) Field of Classification Search
None
See application file for complete search history.

(56) References Cited

U.S. PATENT DOCUMENTS

| | | | | |
|---|---|---|---|---|
| 5,468,681 | A * | 11/1995 | Pasch ........................... | 438/108 |
| 2003/0041427 | A1* | 3/2003 | Hattori ........................ | 29/25.42 |
| 2011/0110050 | A1* | 5/2011 | Sakatani et al. ............. | 361/746 |
| 2013/0284507 | A1* | 10/2013 | Hattori et al. ................ | 174/260 |
| 2014/0016242 | A1 | 1/2014 | Hattori et al. | |
| 2014/0124256 | A1* | 5/2014 | Hattori .................. | H01G 2/065 174/260 |

FOREIGN PATENT DOCUMENTS

| | | |
|---|---|---|
| CN | 101809740 A | 8/2010 |
| CN | 103299382 A | 9/2013 |
| JP | 2012-204572 A | 10/2012 |
| WO | WO-2013-008550 A1 * 1/2013 ............... H01L 2/06 |

* cited by examiner

*Primary Examiner* — Johannes P Mondt
(74) *Attorney, Agent, or Firm* — Oliff PLC

(57) ABSTRACT

An interposer includes a plurality of first connection electrodes each of which is arranged on either of first- and second-side-surface sides of a first principal surface of a substrate; a plurality of second connection electrodes each of which is arranged on either of first- and second-side-surface sides of a second principal surface of the substrate; and a plurality of third connection electrodes each of which is arranged on either of first and second side surfaces. Each of the first connection electrodes has a first portion located away from an edge of the first principal surface, and a second portion extending from the first portion to the edge and connected to the third connection electrode. Each of the second portion of each first connection electrode and the plurality of third connection electrodes has a width smaller than a width of the first portion of each first connection electrode.

5 Claims, 15 Drawing Sheets

ELECTRONIC COMPONENT

BACKGROUND OF THE INVENTION

Field of the Invention

The present invention relates to an electronic component having a multilayer capacitor and an interposer on which the multilayer capacitor is mounted.

Related Background Art

There are known electronic components having a multilayer capacitor and an interposer on which the multilayer capacitor is mounted (e.g., cf. Japanese Patent Application Laid-open Publication No. 2012-204572 (which will be referred to hereinafter as Patent Literature 1)).

When a voltage is applied to a multilayer capacitor, mechanical strain arises in magnitude depending upon the applied voltage in an element body due to an electrostrictive effect. This mechanical strain causes vibration of the multilayer capacitor (which will be referred to hereinafter as electrostrictive vibration). When the multilayer capacitor is mounted on an electronic device (e.g., a circuit board, another electronic component, or the like) and when the voltage is applied thereto, the electrostrictive vibration propagates to the electronic device. As the electrostrictive vibration propagates to the electronic device, the electronic device comes to vibrate, raising a possibility of occurrence of an audible hum known as "buzzing."

In the electronic component described in Patent Literature 1, as described above, the multilayer capacitor is mounted on the interposer. Therefore, when the electronic component described in Patent Literature 1 is mounted on an electronic device, the multilayer capacitor is connected through the interposer to the electronic device. For this reason, the electrostrictive vibration is less likely to propagate to the electronic device, and thus the occurrence of buzzing is suppressed.

SUMMARY OF THE INVENTION

In the electronic component described in Patent Literature 1, recesses are formed at ends of the interposer. The recesses are formed so that at least a part thereof is located under the multilayer capacitor. When the electronic component is mounted by soldering on the electronic device, solder flows into the recesses. The solder flowing into the recesses becomes solidified in the recesses. The solidified solder in the recesses directly connects the multilayer capacitor and the electronic device. For this reason, the electrostrictive vibration occurring in the multilayer capacitor propagates through the solder in the recesses to the electronic device and can cause vibration of the electronic device. Namely, it is difficult to satisfactorily suppress the occurrence of buzzing, in the case of the electronic component described in Patent Literature 1.

An object of the present invention is to provide an electronic component capable of satisfactorily suppressing the occurrence of buzzing.

The present invention provides an electronic component including a multilayer capacitor and an interposer on which the multilayer capacitor is mounted. The multilayer capacitor includes a multilayer body in which a plurality of dielectric layers and a plurality of internal electrodes are stacked and a plurality of external electrodes arranged on ends of the multilayer body and connected to corresponding internal electrodes out of the plurality of internal electrodes. The multilayer body has a substantially rectangular parallelepiped shape. The interposer includes a substrate having first and second principal surfaces of a planar shape opposed to each other, and first and second side surfaces of a planar shape extending in a first direction in which the first principal surface and the second principal surface are opposed, so as to connect the first principal surface and the second principal surface, the first and second side surfaces being opposed to each other, a plurality of first connection electrodes each of which is arranged on either of first- and second-side-surface sides of the first principal surface and to each of which a corresponding external electrode out of the plurality of external electrodes is connected, a plurality of second connection electrodes each of which is arranged on either of first- and second-side-surface sides of the second principal surface, and a plurality of third connection electrodes each of which is arranged on either of the first and second side surfaces and each of which connects the corresponding first connection electrode and the corresponding second connection electrode. Each of the first connection electrodes has a first portion located away from an edge of the first principal surface in a second direction in which the first side surface and the second side surface are opposed, and a second portion extending from the first portion to the edge and connected to the third connection electrode. Each of the second portion of each first connection electrode and the plurality of third connection electrodes has a width in a third direction perpendicular to the first direction and the second direction, smaller than a width in the third direction of the first portion of each first connection electrode.

In the present invention, each first connection electrode has the first portion and the second portion. The first portion is located away from the edge of the first principal surface in the second direction. The second portion extends from the first portion to the edge of the first principal surface and is connected to the third connection electrode. The width in the third direction of each of the second portion and the third connection electrode is smaller than the width in the third direction of the first portion.

When the electronic component according to the present invention is mounted by soldering on an electronic device, molten solder rises on the third connection electrodes to reach the external electrodes of the multilayer capacitor. Therefore, solder fillets are formed spreading over the electronic device, the interposer, and the multilayer capacitor. At this time, since the first portion is located away from the edge of the first principal surface, the solder rising on the third connection electrode is prevented from spreading across the edge of the first principal surface directly onto the first portion.

Furthermore, the width in the third direction of each of the second portion and the third connection electrode is smaller than the width in the third direction of the first portion. For this reason, a solder risen region (a region in which the solder has risen) itself is limited to a narrow range, which makes an amount of the solder reaching the multilayer capacitor (external electrodes) smaller. For these reasons, the formed solder fillets become smaller, so as to reduce the vibration propagating through the solder fillets from the multilayer capacitor to the electronic device. As a result, the occurrence of buzzing is satisfactorily suppressed.

An area of each second connection electrode may be smaller than an area of each first connection electrode. In this case, the connection area between the interposer and the electronic device becomes smaller, so as to reduce the vibration propagating from the interposer to the electronic device. As a result, the occurrence of buzzing is more satisfactorily suppressed.

Each third connection electrode may include a region with a narrower width in the third direction, midway in the first direction. In this case, the amount of the solder rising on the third connection electrode becomes much smaller, so as to make the solder fillets much smaller. As a result, the occurrence of buzzing is more satisfactorily suppressed.

The electronic component may further comprise a resin arranged between the multilayer capacitor and the interposer and connecting the multilayer body and the substrate. In this case, connection strength between the multilayer capacitor and the interposer is enhanced.

A thickness of the substrate may be in the range of 60 to 300 μm. In this case, the thickness of the substrate (interposer) is relatively small and thus electric current paths in the electronic component become shorter. As a result, reduction in ESL (Equivalent Series Inductance) is achieved.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The embodiment of the present invention will be described below in detail with reference to the accompanying drawings. In the description, identical elements or elements with identical functionality will be denoted by the same reference signs, without redundant description.

Figure 1:
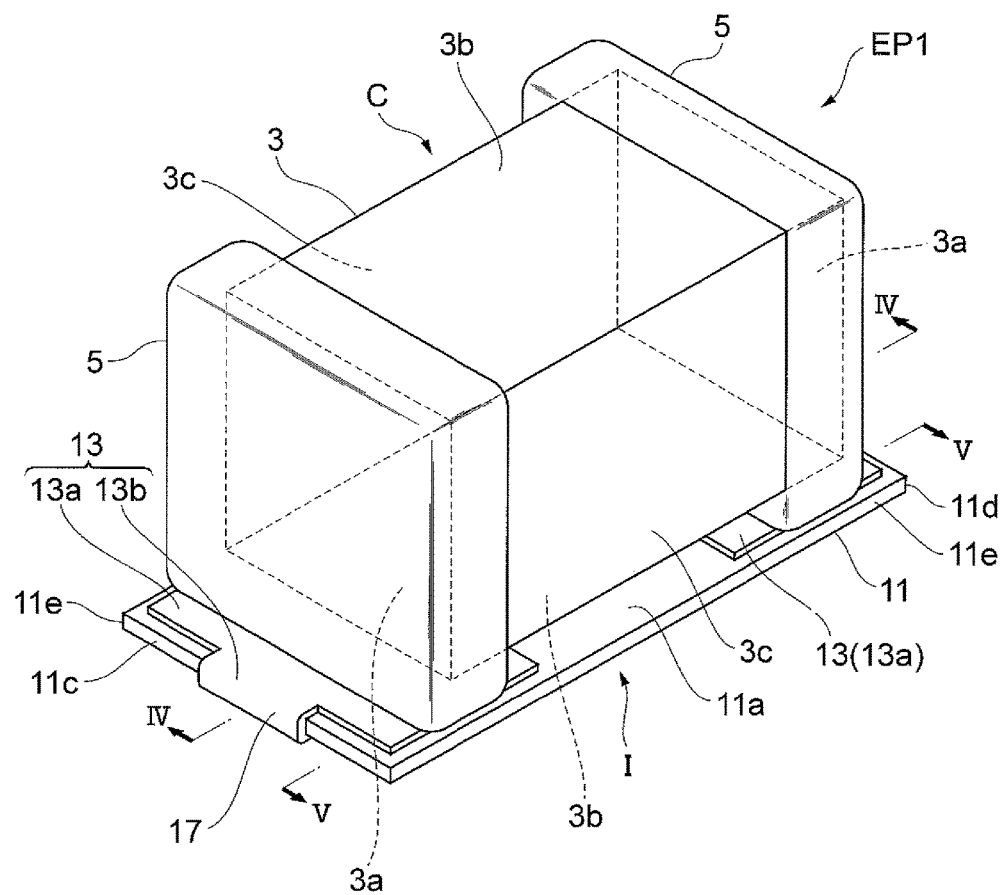
FIG. 1 is a perspective view showing an electronic component according to an embodiment of the present invention.
Figure 2:
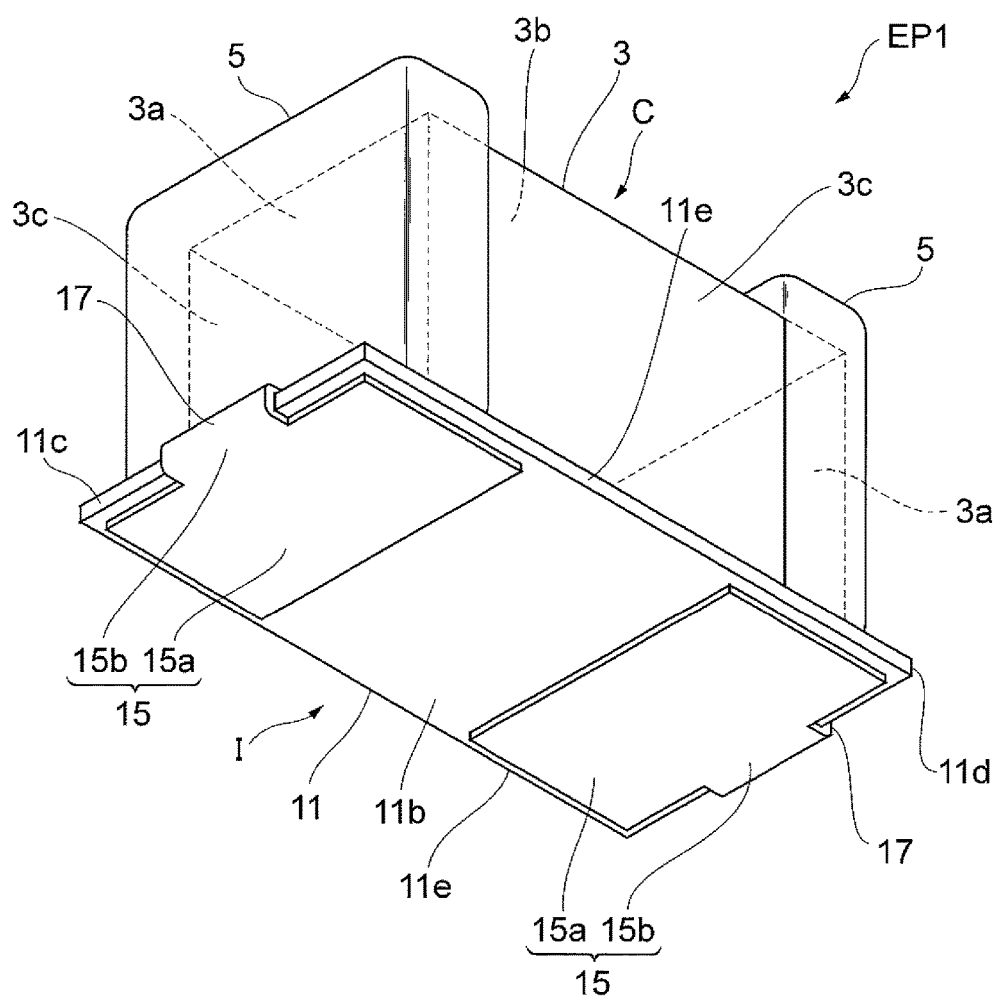
FIG. 2 is a perspective view showing the electronic component according to the embodiment.
Figure 3:
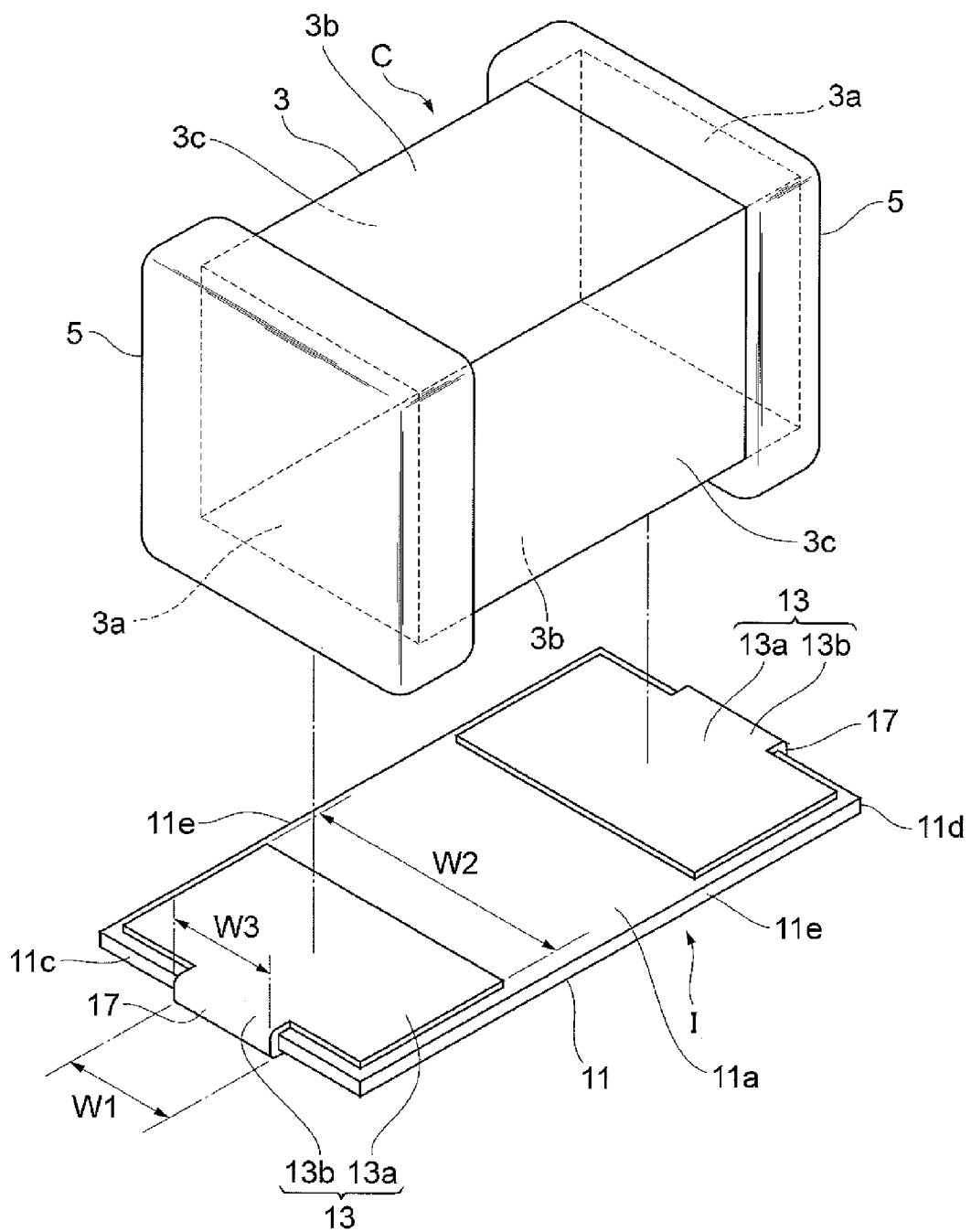
FIG. 3 is a perspective view showing the electronic component according to the embodiment.
Figure 4:
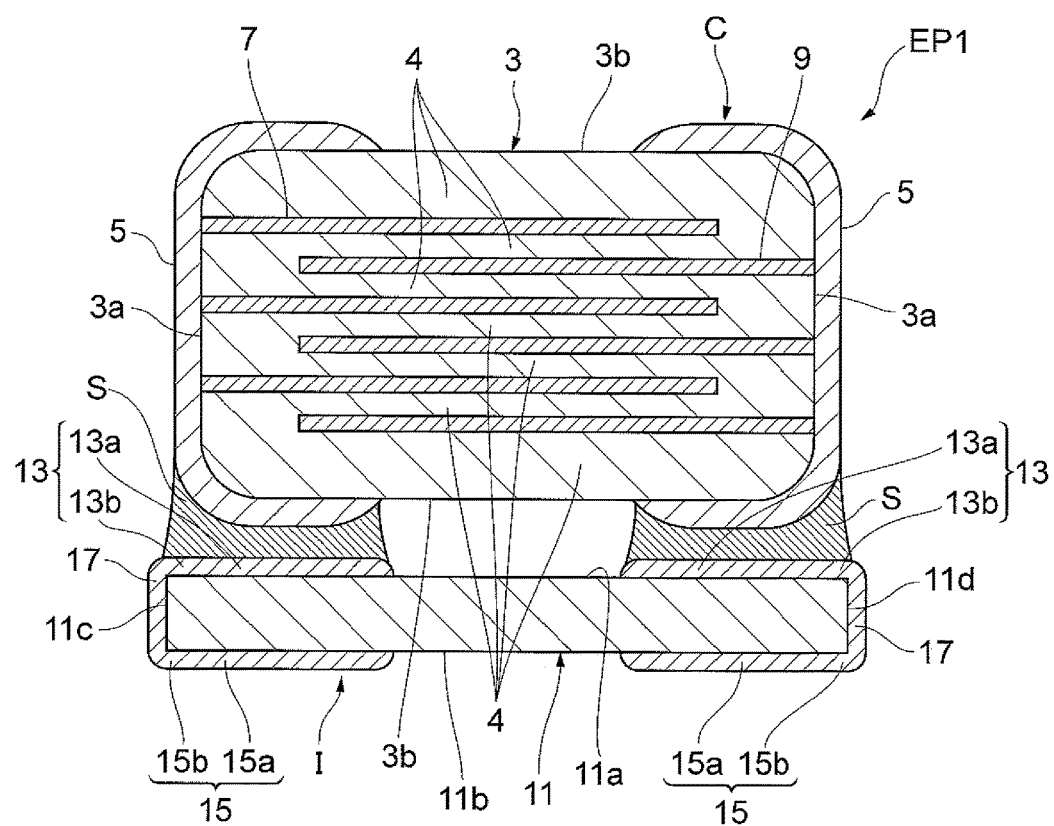
FIG. 4 is a drawing for explaining a cross-sectional configuration along the line IV-IV in FIG. 1.
Figure 5:
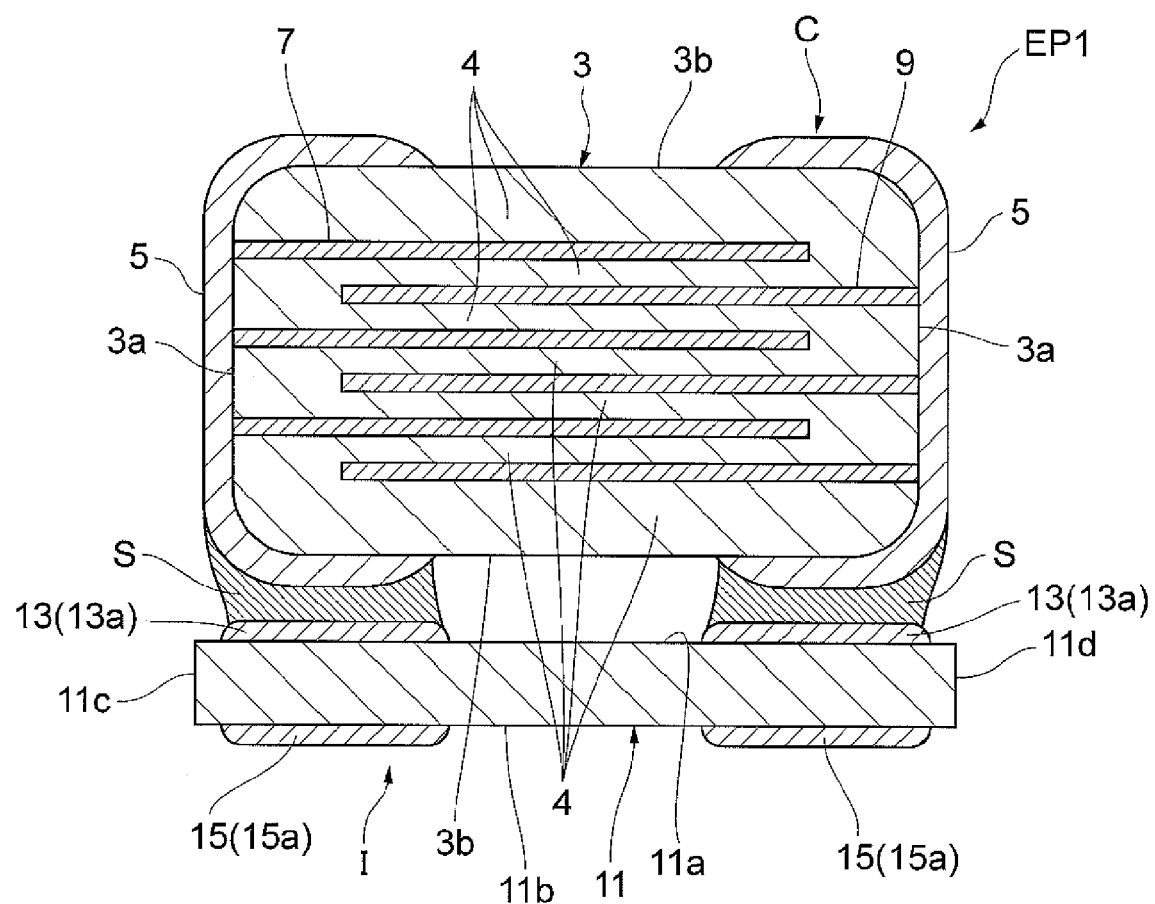
FIG. 5 is a drawing for explaining a cross-sectional configuration along the line V-V in FIG. 1.

A configuration of an electronic component EP1 according to the present embodiment will be described with reference to FIGS. 1 to 5. FIGS. 1 to 3 are perspective views showing the electronic component according to the present embodiment. FIG. 4 is a drawing for explaining a cross-sectional configuration along the line IV-IV in FIG. 1. FIG. 5 is a drawing for explaining a cross-sectional configuration along the line V-V in FIG. 1.

The electronic component EP1, as shown in FIGS. 1 to 5, has a multilayer capacitor C and an interposer I. In the present embodiment, the multilayer capacitor C and the interposer I are connected by solder S. Namely, the multilayer capacitor C is mounted by soldering on the interposer I. The multilayer capacitor C and the interposer I may be connected by an electroconductive resin.

The multilayer capacitor C has an element body 3, and a plurality of external electrodes 5 arranged on end portions of the element body 3. In the present embodiment, the multilayer capacitor C has a pair of external electrodes 5.

The element body 3 has a substantially rectangular parallelepiped shape. The element body 3 has, as its exterior surface, a pair of end surfaces 3a opposed to each other, a pair of first side surfaces 3b opposed to each other, and a pair of second side surfaces 3c opposed to each other. Each of the first side surfaces 3b and each of the second side surfaces 3c have a substantially rectangular shape. The longitudinal direction of the element body 3 is a direction in which the pair of end surfaces 3a are opposed (hereinafter referred to as opposed direction of the end surfaces 3a).

The pair of first side surfaces 3b extend in the opposed direction of the end surfaces 3a so as to connect the pair of end surfaces 3a. The pair of first side surfaces 3b also extend in a direction in which the pair of second side surfaces 3c are opposed (hereinafter referred to as opposed direction of the second side surfaces 3c). The pair of second side surfaces 3c extend in the opposed direction of the end surfaces 3a so as to connect the pair of end surfaces 3a. The pair of second side surfaces 3c also extend in a direction in which the pair of first side surfaces 3b are opposed (hereinafter referred to as opposed direction of the first side surfaces 3b).

The element body 3 is composed of a plurality of dielectric layers 4 stacked in the opposed direction of the first side surfaces 3b. In the element body 3, the direction in which the plurality of dielectric layers 4 are stacked (which will be referred to hereinafter simply as "stack direction") is coincident with the opposed direction of the first side surfaces 3b. Each dielectric layer 4 is comprised, for example, of a sintered body of a ceramic green sheet containing a dielectric material (a dielectric ceramic such as $BaTiO_3$—, $Ba(Ti,Zr)O_3$—, or $(Ba, Ca)TiO_3$-based ceramic). In the actual element body 3, the dielectric layers 4 are integrated with each other so that no boundary can be visually recognized between the dielectric layers 4.

The external electrodes 5 are arranged on the end surface 3a sides of the element body 3. The external electrodes 5 are formed so as to cover the end surfaces 3a and partial areas of the respective edge portions of the pair of first side surfaces 3b and the pair of second side surfaces 3c. Namely, each external electrode 5 has an electrode portion located on the end surface 3a and an electrode portion located on the partial areas of the respective side surfaces 3b, 3c.

The external electrodes 5 are formed, for example, by applying an electroconductive paste containing electroconductive metal powder and glass frit onto the external surface of the element body 3 and sintering the paste. A plated layer can be formed on the sintered external electrodes 5 as occasion may demand. The external electrodes 5 are electrically isolated from each other on the external surface of the element body 3.

The element body 3, as shown in FIGS. 4 and 5, has a plurality of internal electrodes 7 and a plurality of internal electrodes 9. The element body 3 is composed of a multilayer body in which the plurality of dielectric layers 4 and the plurality of internal electrodes 7 and internal electrodes 9 are stacked. Each internal electrode 7 or 9 has, for example, a substantially rectangular shape on the plan view. Each internal electrode 7 or 9 is comprised of an electroconductive material (e.g., Ni or Cu or the like) commonly used as internal electrodes of multilayer electric elements. Each internal electrode 7 or 9 is comprised of a sintered body of an electroconductive paste containing the foregoing electroconductive material.

The internal electrodes 7 and the internal electrodes 9 are arranged at different positions (layers) in the opposed direction of the first side surfaces 3b. Namely, the internal electrodes 7 and the internal electrodes 9 are alternately arranged so as to be opposed with a space in between in the opposed direction of the first side surfaces 3b. Each internal electrode 7 is exposed at its one end in one end surface 3a. Each internal electrode 7 is connected at the one end exposed in the one end surface 3a, to one external electrode 5. Each internal electrode 9 is exposed at its one end in the other end surface 3a. Each internal electrode 9 is connected at the one end exposed in the other end surface 3a, to the other external electrode 5. Each internal electrode 7 and each internal electrode 9 have their respective polarities opposite to each other.

The interposer I has a substrate 11, a plurality of first connection electrodes 13, a plurality of second connection electrodes 15, and a plurality of third connection electrodes 17. In the present embodiment, the interposer I has a pair of first connection electrodes 13, a pair of second connection electrodes 15, and a pair of third connection electrodes 17. The first to third connection conductors are comprised of Cu or the like, for example.

The substrate 11 has a substantially rectangular shape on the plan view. The substrate 11 has first and second principal surfaces 11a, 11b of a planar shape opposed to each other, first and second side surfaces 11c, 11d of a planar shape opposed to each other, and a pair of third side surfaces 11e of a planar shape opposed to each other. The substrate 11 has an electrical insulation property. The substrate 11 is comprised, for example, of an electrically-insulating resin such as glass epoxy resin. The thickness of the substrate 11 is set in the range of 60 to 300 μm.

The first and second side surfaces 11c, 11d extend in a direction in which the first principal surface 11a and the second principal surface 11b are opposed (which will be referred to hereinafter as first direction), so as to connect the first and second principal surfaces 11a, 11b. The first and second side surfaces 11c, 11d also extend in a direction in which the pair of third side surfaces 11e are opposed (hereinafter referred to as opposed direction of the third side surfaces 11e). The pair of third side surfaces 11e extend in the first direction so as to connect the first and second principal surfaces 11a, 11b. The pair of third side surfaces 11e also extend in a direction in which the first side surface 11c and the second side surface 11d are opposed (which will be referred to hereinafter as second direction).

The first and second principal surfaces 11a, 11b have a rectangular shape the longitudinal direction of which is the second direction and the transverse direction of which is the opposed direction of the third side surfaces 11e. The opposed direction of the third side surfaces 11e is perpendicular to the first direction and the second direction. The substrate 11 is formed in a size approximately equal to or slightly larger than that of the multilayer capacitor C.

Each of the pair of first connection electrodes 13 is arranged on either of the first-side-surface-11c side and the second-side-surface-11d side of the first principal surface 11a. Namely, the pair of first connection electrodes 13 are separated in the second direction on the first principal surface 11a.

Each of the first connection electrodes 13 has a first portion 13a and a second portion 13b. The first portion 13a is located away from the edge of the first principal surface 11a (the short side of the first principal surface 11a) in the second direction. Namely, the first portion 13a is separated in the second direction from the corner made by the first side surface 11c (or the second side surface 11d) and the first principal surface 11a (which will be referred to hereinafter as first corner). The first portion 13a is located away from the edges of the first principal surface 11a (the long sides of the first principal surface 11a) in the opposed direction of the third side surfaces 11e. Namely, the first portion 13a is separated in the opposed direction of the third side surfaces 11e from the corners made by the third side surfaces 11e and the first principal surface 11a.

The second portion 13b extends from the first portion 13a to the edge of the first principal surface 11a (the short side of the first principal surface 11a). The first portion 13a and the second portion 13b are integrally formed. In the present embodiment, the first portion 13a has a rectangular shape.

As shown in FIGS. 4 and 5, one external electrode 5 is connected to one first connection electrode 13, while the other external electrode 5 is connected to the other first connection electrode 13. The multilayer capacitor C is arranged on the interposer I so that the first side surface 3b or the second side surface 3c is opposed to the first principal surface 11a. In the present embodiment, the multilayer capacitor C is arranged on the interposer I so that the first side surface 3b is opposed to the first principal surface 11a. In the present embodiment, the stack direction in the multilayer capacitor C is coincident with the first direction in the interposer I (substrate 11).

Each of the pair of second connection electrodes 15 is arranged on either of the first-side-surface 11c side and the second-side-surface-11d side of the second principal surface 11b. Namely, the pair of second connection electrodes 15 are separated in the second direction on the second principal surface 11b.

Each of the second connection electrodes 15 has a first portion 15a and a second portion 15b. The first portion 15a is located away from the edge of the second principal surface 11b (the short side of the second principal surface 11b) in the second direction. Namely, the first portion 15a is separated in the second direction from the corner made by the first side surface 11c (or the second side surface 11d) and the second principal surface 11b (which will be referred to hereinafter as second corner). The first portion 15a is located away from the edges of the second principal surface 11b (the long sides of the second principal surface 11b) in the opposed direction of the third side surfaces 11e. Namely, the first portion 15a is separated in the opposed direction of the third side surfaces 11e from the corners made by the third side surfaces 11e and the second principal surface 11b.

The second portion 15b extends from the first portion 15a to the edge of the first principal surface 11b (the short side of the second principal surface 11b). The first portion 15a and the second portion 15b are integrally formed. In the present embodiment, the first portion 15a has a rectangular shape.

Figure 6:
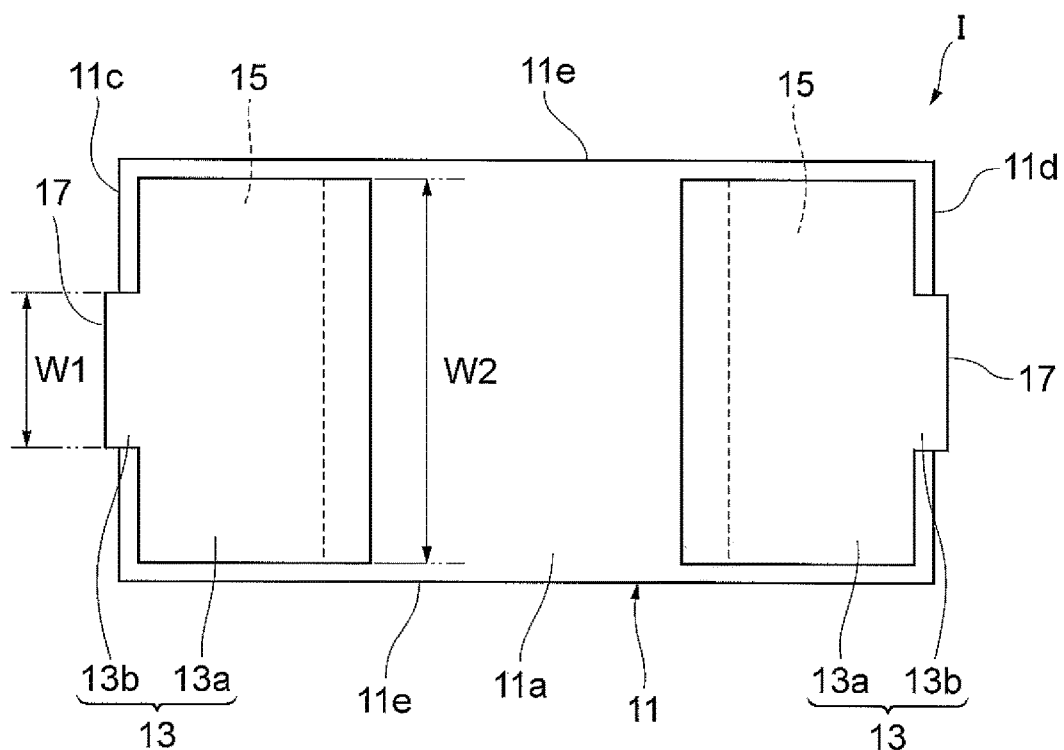
FIG. 6 is a plan view showing an interposer.

In the present embodiment, the first connection electrodes 13 and the second connection electrodes 15 have the same shape and the same area. Namely, the first connection electrodes 13 and the second connection electrodes 15 overlap on the whole when viewed from the first direction. The area of the second connection electrodes 15 may be set smaller than that of the first connection electrodes 13, as shown in FIG. 6.

The pair of third connection electrodes 17 are arranged on the first side surface 11c and on the second side surface 11d, respectively. Each third connection electrode 17 connects the first connection electrode 13 and the second connection electrode 15. The third connection electrode 17 is connected at the first corner to the second portion 13b of the first connection electrode 13. The third connection electrode 17 is connected at the second corner to the second portion 15b of the second connection electrode 15. The first connection electrode 13 and the second connection electrode 15 are electrically connected through the third connection electrode 17.

A width W1 in a third direction perpendicular to the first direction and the second direction (the third direction is the opposed direction of the third side surfaces 11e in the present embodiment), of the second portion 13b of each first connection electrode 13 is set smaller than a width W2 in the third direction of the first portion 13a of each first connection electrode 13. A width W3 in the third direction of each third connection electrode 17 is also set smaller than the width W2 in the third direction of the first portion 13a of each first connection electrode 13. The width W2 of the first portion 13a is set smaller than the width in the third direction of the element body 3.

In the present embodiment, the width W1 of the second portion 13b and the width W3 of the third connection electrode 17 are set equal. The width W1 of the second portion 13b and the width W3 of the third connection electrode 17 may be different. In the present embodiment, the second portion 15b of each second connection electrode 15 also has the width in the third direction set smaller than the width in the third direction of the first portion 15a of each second connection electrode 15.

Figure 7:
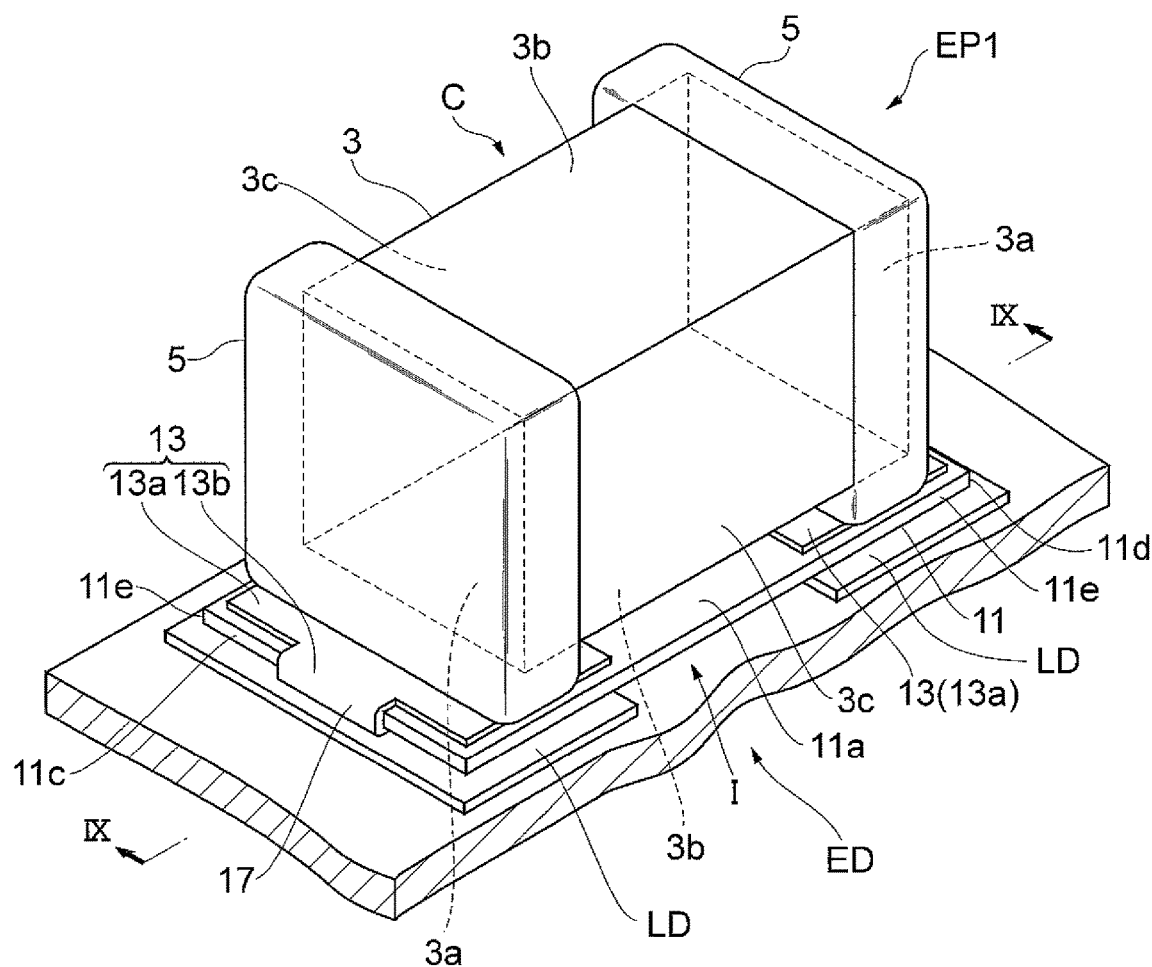
FIG. 7 is a perspective view showing a mounting example of the electronic component according to the embodiment.
Figure 8:
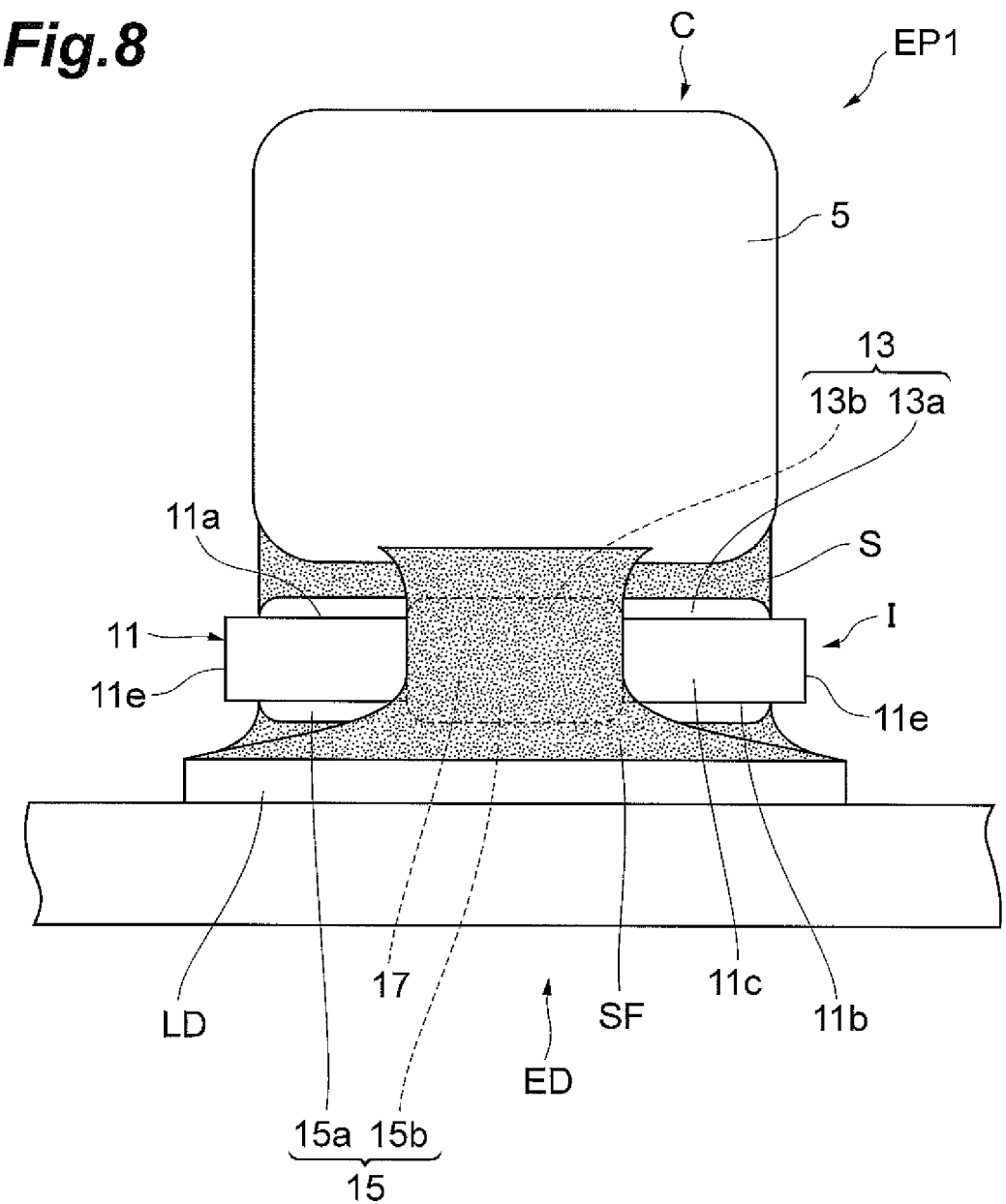
FIG. 8 is a front view showing the mounting example of the electronic component according to the embodiment.
Figure 9:
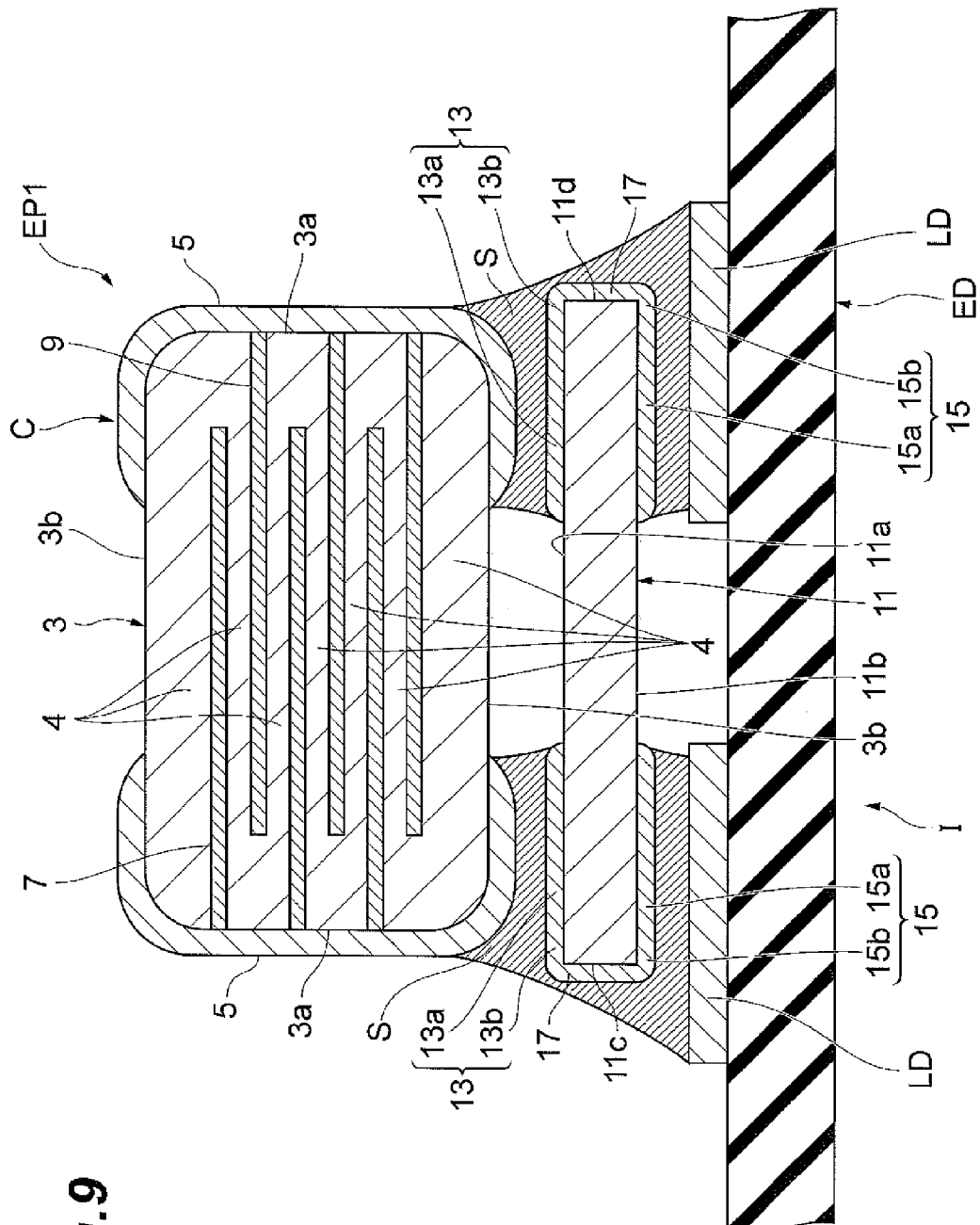
FIG. 9 is a drawing for explaining a cross-sectional configuration along the line IX-IX in FIG. 7.

The below will describe a mounting example of the electronic component EP1, with reference to FIGS. 7 to 9. FIG. 7 is a perspective view showing the mounting example of the electronic component according to the present embodiment. FIG. 8 is a front view showing the mounting example of the electronic component according to the present embodiment. FIG. 9 is a drawing for explaining a cross-sectional configuration along the line IX-IX in FIG. 7.

The electronic component EP1 is mounted on an electronic device ED (e.g., a circuit board, an electronic component, or the like), as shown in FIGS. 7 to 9. In the electronic component EP1, the second principal surface 11b serves as a mounted surface on the electronic device ED. In this mounting example, the electronic component EP1 is mounted by soldering on the electronic device ED. Each second connection electrode 15 is connected to a land electrode LD of the electronic device ED.

In a state in which the electronic component EP1 is mounted on the electronic device ED, the multilayer capacitor C is connected through the interposer I to the electronic device ED. For this reason, the electrostrictive vibration is less likely to propagate to the electronic device ED, resulting in suppressing the occurrence of buzzing.

When the electronic component EP1 is mounted by soldering on the electronic device ED, solder fillets SF are formed spreading over the electronic component EP1 and the electronic device ED, i.e., spreading over the electronic device ED, the interposer I, and the multilayer capacitor C. The solder fillets SF are formed in such a manner that the molten solder rises on the third connection electrodes 17 to reach the external electrodes 5 of the multilayer capacitor C and then the molten solder becomes solidified. FIG. 7 is drawn without illustration of the solder fillets SF. In FIG. 8, the solder S and solder fillets SF are indicated by dot hatching.

The first portion 13a of each first connection electrode 13 is located away from the edge of the first principal surface 11a (the short side of the first principal surface 11a) in the second direction. For this reason, the solder rising on each third connection electrode 17 is prevented from spreading across the foregoing edge of the first principal surface 11a directly onto the first portion 13a.

The width in the third direction of each of the second portion 13b of each first connection electrode 13 and the third connection electrodes 17 is smaller than the width in the third direction of the first portion 13a. For this reason, a solder risen region itself is limited to a narrow range and thus an amount of the solder reaching the multilayer capacitor C (external electrodes 5) becomes smaller.

For these reasons, the solder fillets SF formed are made smaller in the electronic component EP1 of the present embodiment. This results in further reducing the vibration propagating through the solder fillets SF from the multilayer capacitor C to the electronic device ED. As a result, the occurrence of buzzing is satisfactorily suppressed.

In the present embodiment, if the area of the second connection electrodes 15 is set smaller than the area of the first connection electrodes 13, the connection area between the interposer I and the electronic device ED becomes relatively smaller. For this reason, the vibration propagating from the interposer I to the electronic device ED is further reduced. As a result, the occurrence of buzzing is more satisfactorily suppressed.

In the present embodiment, the thickness of the substrate 11 is set in the range of 60 to 300 μm. For this reason, the thickness of the substrate 11 (interposer I) is relatively small and electric current paths in the electronic component EP1 become shorter. Therefore, reduction in ESL is achieved in the electronic component EP1.

Figure 10:
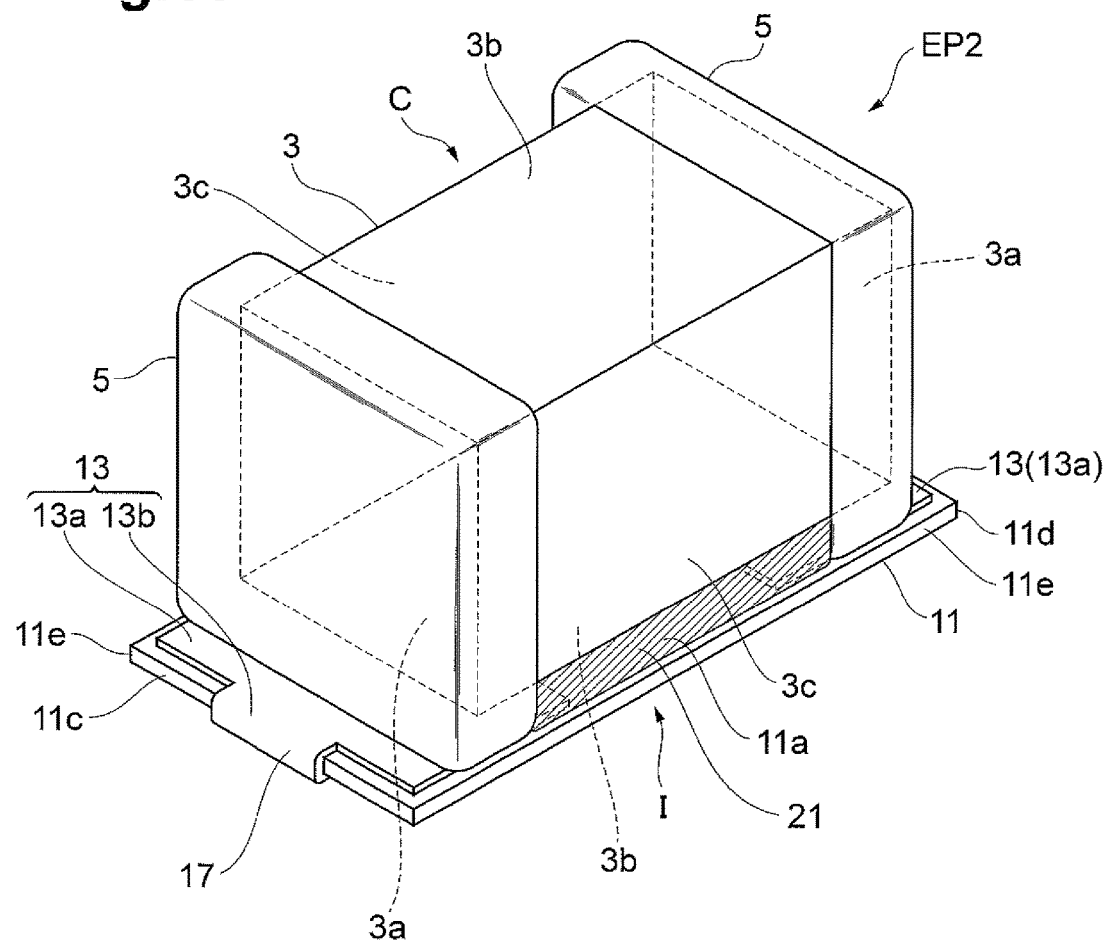
FIG. 10 is a perspective view showing an electronic component according to a modification example of the embodiment.
Figure 11:
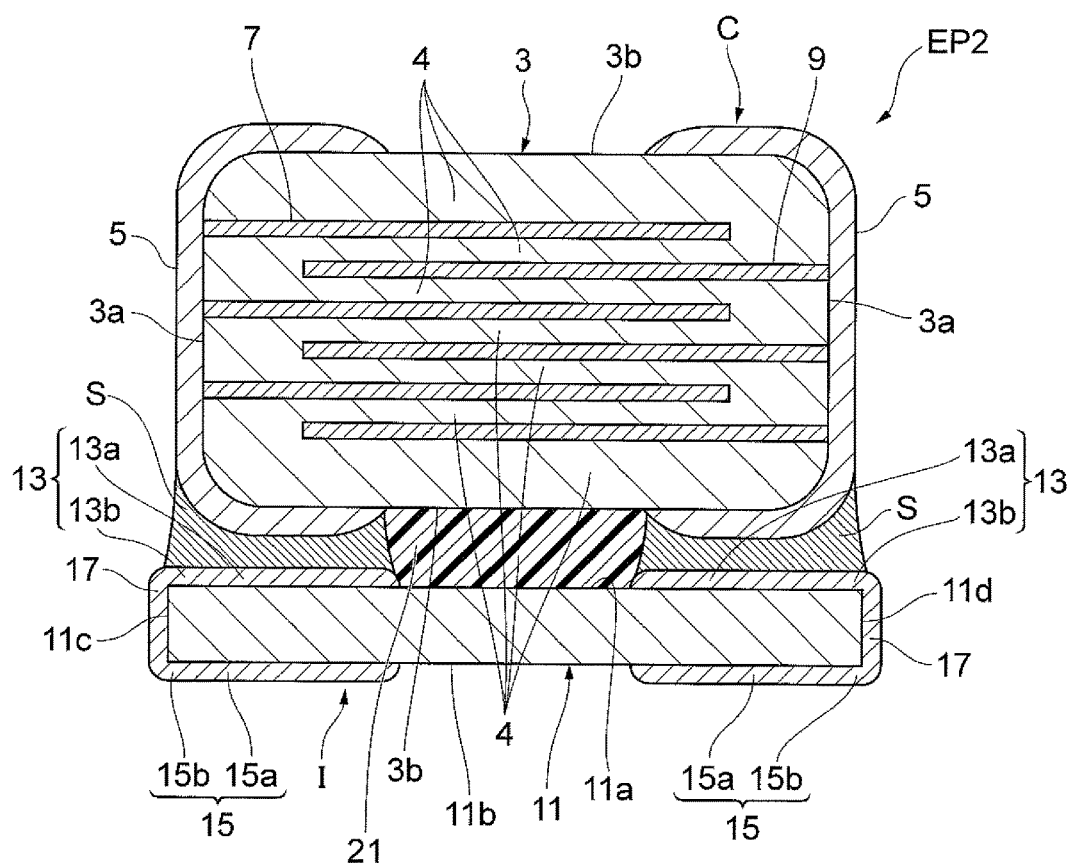
FIG. 11 is a drawing for explaining a cross-sectional configuration of the electronic component according to the modification example of the embodiment.

The following will describe a configuration of an electronic component EP2 according to a modification example of the embodiment, with reference to FIGS. 10 and 11. FIG. 10 is a perspective view showing the electronic component according to the modification example of the embodiment. FIG. 11 is a drawing for explaining a cross-sectional configuration of the electronic component according to the modification example of the embodiment.

In the present modification example, the electronic component EP2 has the multilayer capacitor C, the interposer I, and a resin 21. The resin 21 is arranged between the multilayer capacitor C and the interposer I. The resin 21 connects the element body 3 and the substrate 11. Namely, the resin 21 is in contact with the first side surface 3b of the element body 3 and in contact with the first principal surface 11a of the substrate 11. In FIG. 10, the resin is indicated by hatching.

Since in the electronic component EP2 of the present modification example the resin 21 connects the element body 3 and the substrate 11, it can enhance the connection strength between the multilayer capacitor C and the interposer I. Examples of the resin 21 applicable herein include glass-reinforced epoxy resin, glass-reinforced PTFE (polytetrafluoroethylene), bismaleimide triazine resin, liquid crystal polymer, polyimide resin, polyamide imide resin, and so on.

Figure 12:
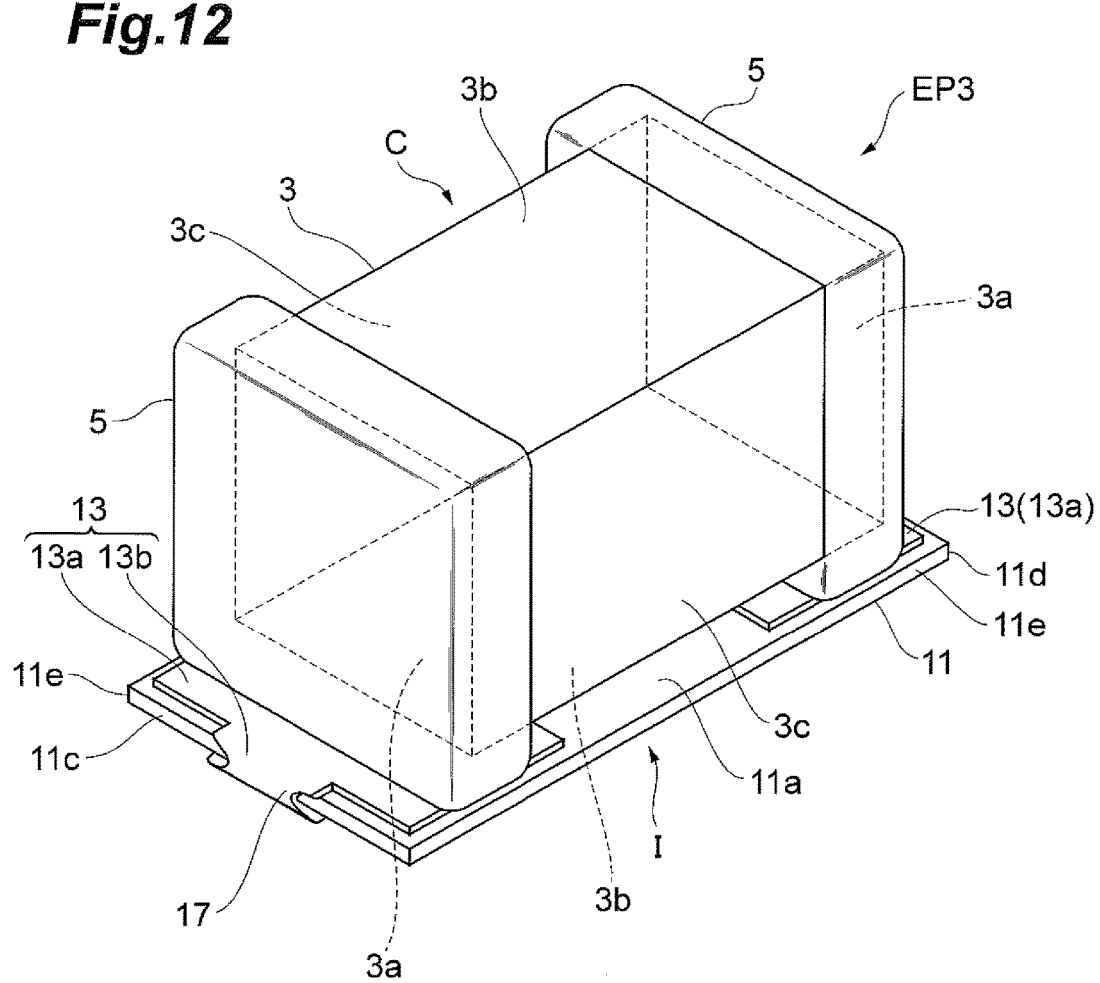
FIG. 12 is a perspective view showing an electronic component according to another modification example of the embodiment.
Figure 13:
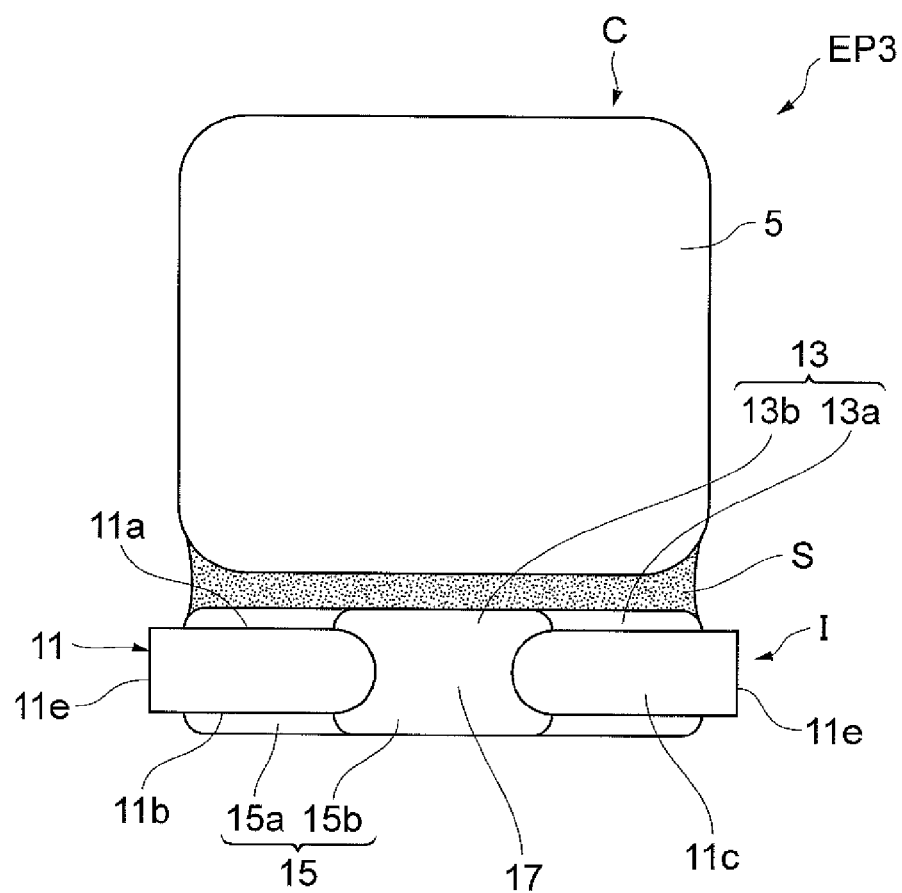
FIG. 13 is a front view showing the electronic component according to the modification example of the embodiment.

The following will describe a configuration of an electronic component EP3 according to another modification example of the embodiment, with reference to FIGS. 12 and 13. FIG. 12 is a perspective view showing the electronic component according to the modification example of the embodiment. FIG. 13 is a front view showing the electronic component according to the modification example of the embodiment.

The electronic component EP3 has the multilayer capacitor C and the interposer I, as shown in FIGS. 12 and 13. In this modification example, each third connection electrode 17 includes a region with a narrower width in the third direction, midway in the first direction. Namely, each third connection electrode 17 is constricted in the third direction, in the middle in the first direction. In FIG. 13, the solder S is indicated by dot hatching.

In the present modification example, since each third connection electrode 17 includes the above-described region with the narrower width in the third direction, the amount of the solder rising on the third connection electrodes 17 becomes much smaller. This makes the formed solder fillets SF much smaller, whereby the occurrence of buzzing is more satisfactorily suppressed.

Figure 14:
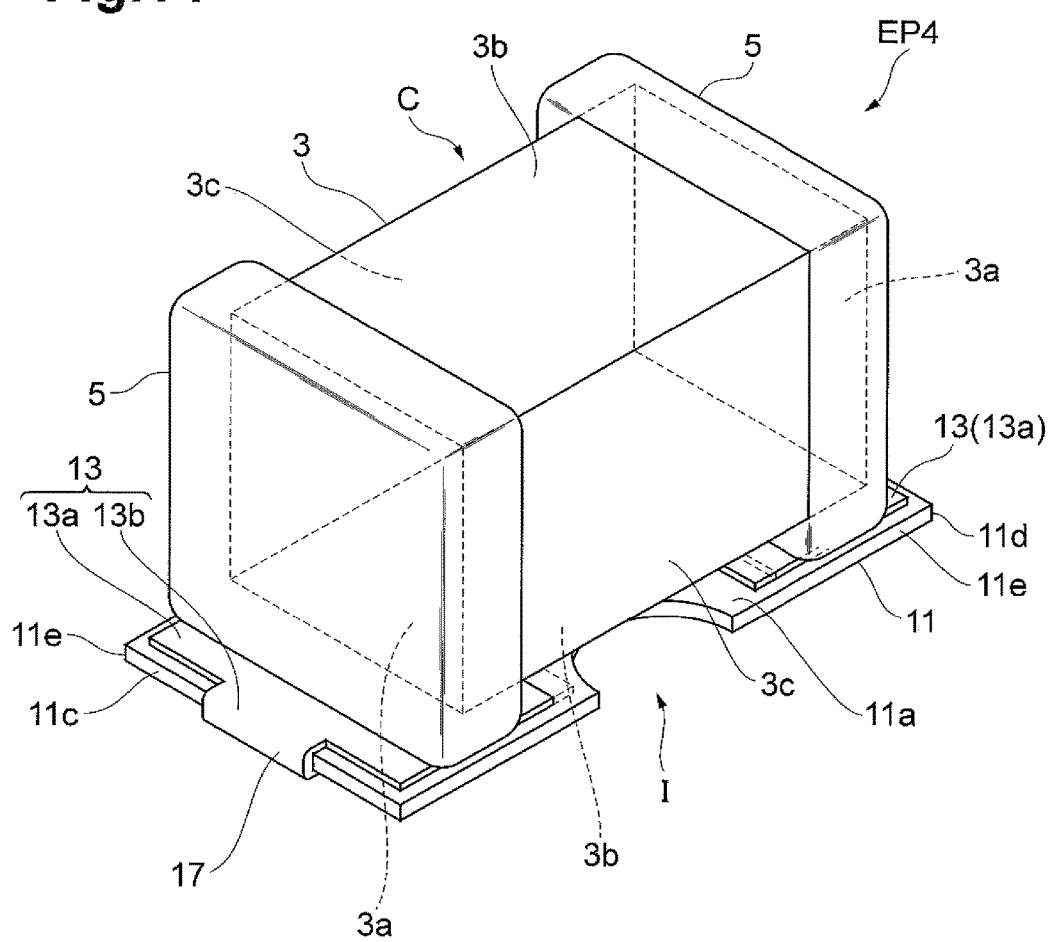
FIG. 14 is a perspective view showing an electronic component according to another modification example of the embodiment.
Figure 15:
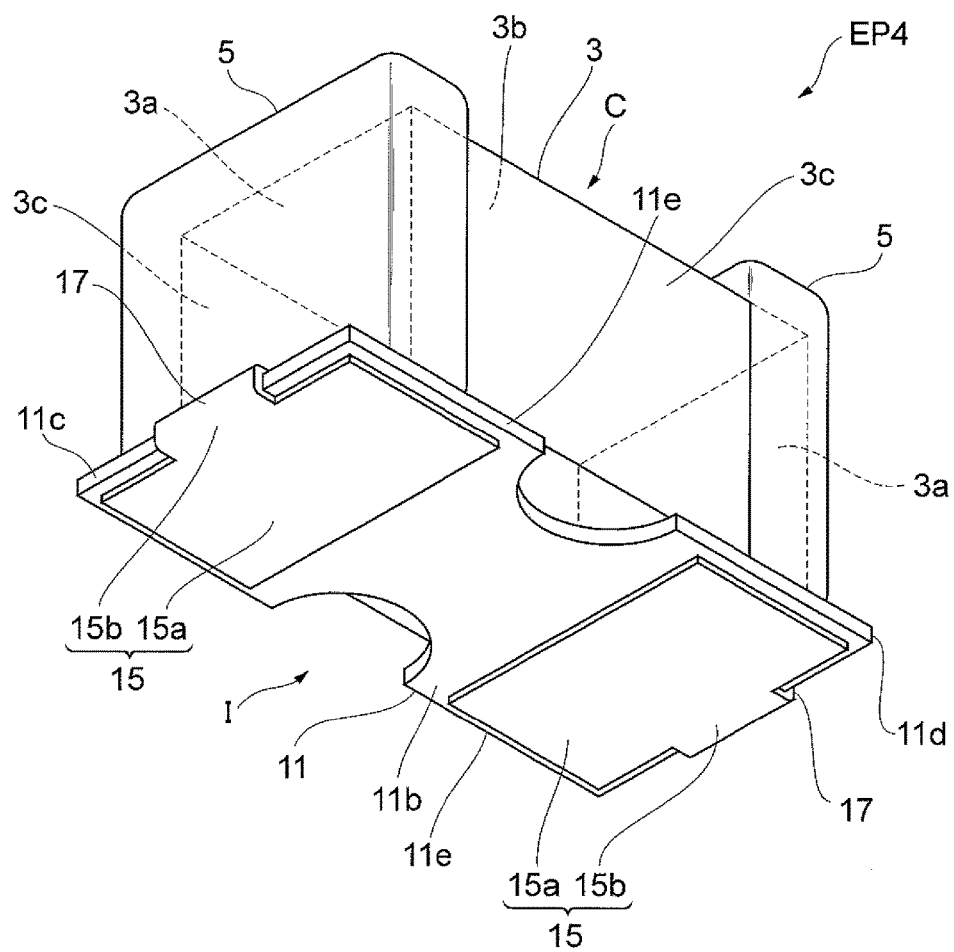
FIG. 15 is a perspective view showing the electronic component according to the modification example of the embodiment.

The following will describe a configuration of an electronic component EP4 according to another modification example of the embodiment, with reference to FIGS. 14 and 15. FIGS. 14 and 15 are perspective views showing the electronic component according to the modification example of the embodiment.

The electronic component EP4 has the multilayer capacitor C and the interposer I, as shown in FIGS. 14 and 15. In this modification example, the substrate 11 includes a region with a narrower width in the third direction, between the pair of first connection electrodes 13. Namely, the substrate 11 is constricted in the third direction in the region between the pair of first connection electrodes 13. This makes partial areas of the first side surface 3b of the element body 3 exposed from the interposer I when the electronic component EP4 is viewed from the second principal surface 11b side.

In the present modification example, the substrate 11 includes the foregoing region with the narrower width in the third direction. For this reason, fine dust is prevented from accumulating in the space between the multilayer capacitor C and the interposer I and the cleaning capability of the space is improved.

The above described the embodiment of the present invention but it should be noted that the present invention is by no means intended to be limited to the above-described embodiment and can be modified in many ways without departing from the spirit and scope of the invention.

The shapes of the first to third connection electrodes 13, 15, 17 are not limited to those in the above embodiment and modification examples. For example, the second connection electrodes 15 may be configured without the second portion 15b. Namely, the first portion 15a may extend up to the edge of the second principal surface 11b (the short side of the second principal surface 11b). In the first and second connection electrodes 13, 15, the respective first portions 13a, 15a thereof may be configured to reach the edges of the first or second principal surface 11a, 11b (the long sides of the first or second principal surface 11a, 11b), in the opposed direction of the third side surfaces 11e.

What is claimed is:

1. An electronic component comprising a multilayer capacitor and an interposer on which the multilayer capacitor is mounted,
   wherein the multilayer capacitor comprises:
   a multilayer body in which a plurality of dielectric layers and a plurality of internal electrodes are stacked, the multilayer body having a substantially rectangular parallelepiped shape; and
   a plurality of external electrodes arranged on ends of the multilayer body and connected to corresponding internal electrodes out of the plurality of internal electrodes,
   wherein the interposer comprises:
   a substrate having a rectangular shape in plan view and having first and second principal surfaces of a planar shape opposed to each other, and first and second side surfaces of a planar shape extending in a first direction in which the first principal surface and the second principal surface are opposed, so as to connect the first principal surface and the second principal surface, the first and second side surfaces being opposed to each other;
   a plurality of first connection electrodes each of which is arranged on a corresponding one of first- and second-side-surface sides of the first principal surface and to each of which a corresponding external electrode out of the plurality of external electrodes is connected;
   a plurality of second connection electrodes each of which is arranged on corresponding one of first- and second-side-surface sides of the second principal surface; and
   a plurality of third connection electrodes each of which is arranged on a corresponding one of the first and second side surfaces and each of which connects a corresponding first connection electrode and a corresponding second connection electrode,
   wherein each of the first connection electrodes has a first portion located away from an edge of the first principal surface in a second direction in which the first side surface and the second side surface are opposed, and a second portion extending from the first portion to the edge and connected to the third connection electrode,
   wherein said second portion has a first width in the third direction perpendicular to the first direction and to the second direction, and wherein each third connection electrode of the plurality of third connection electrodes has a second width in the third direction, wherein said first and second widths are smaller than a width in the third direction of the first portion of each first connection electrode of the plurality of first connection electrodes,
   wherein each of the first and second side surfaces includes a first surface region on which a corresponding third connection electrode is disposed and a pair of second surface regions exposed from the third connection electrode, the first surface region is located between the pair of second surface regions in the third direction, the third connection electrodes are each arranged only on the first surface region of a respective one of the first and second side surfaces in the third direction.

2. The electronic component according to claim 1, wherein the first connection electrodes are disposed between the multilayer capacitor and the substrate; and
wherein an area of each second connection electrode is smaller than an area of each first connection electrode.

3. The electronic component according to claim 1, wherein each third connection electrode includes a first region connected to the corresponding first connection electrode, a second region connected to the corresponding second connection electrode, and a third region located between the first region and second region, and a width of the third region in the third direction is smaller than a width of each of the first region and the second region in the third direction.

4. The electronic component according to claim 1, further comprising:
a resin arranged between the multilayer capacitor and the interposer and connecting the multilayer body and the substrate.

5. The electronic component according to claim 1, wherein a thickness of the substrate is in the range of 60 to 300 μm.

* * * * *